(12) United States Patent
Lehmann et al.

(10) Patent No.: US 11,886,276 B2
(45) Date of Patent: Jan. 30, 2024

(54) AUTOMATICALLY CORRELATING PHENOMENA DETECTED IN MACHINE GENERATED DATA TO A TRACKED INFORMATION TECHNOLOGY CHANGE

(71) Applicant: ServiceNow, Inc., Santa Clara, CA (US)

(72) Inventors: Yaron Lehmann, Tel Aviv (IL); Dror Mann, New York, NY (US); Gabby Menahem, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 244 days.

(21) Appl. No.: 17/099,501

(22) Filed: Nov. 16, 2020

(65) Prior Publication Data
US 2022/0156134 A1 May 19, 2022

(51) Int. Cl.
| | | |
|---|---|---|
| *G06F 11/00* | (2006.01) | |
| *G06N 20/00* | (2019.01) | |
| *G06Q 10/0635* | (2023.01) | |

(52) U.S. Cl.
CPC ........... *G06F 11/004* (2013.01); *G06N 20/00* (2019.01); *G06Q 10/0635* (2013.01)

(58) Field of Classification Search
CPC .............. G06F 11/004; G06F 11/3476; G06F 11/0793; G06N 20/00; G06Q 10/0635
See application file for complete search history.

(56) References Cited

U.S. PATENT DOCUMENTS

| | | | |
|---|---|---|---|
| 8,996,532 B2 | 3/2015 | Bhatt | |
| 9,288,117 B1 * | 3/2016 | Angrish | H04L 65/611 |
| 10,019,486 B2 | 7/2018 | Kephart | |
| 10,366,337 B2 | 7/2019 | Kephart | |
| 11,146,599 B1 * | 10/2021 | Jackson | H04L 65/1101 |
| 11,245,614 B1 * | 2/2022 | Backes | H04L 12/4641 |
| 2017/0116091 A1 * | 4/2017 | Anderson | G06F 11/004 |
| 2017/0178038 A1 | 6/2017 | Guven | |
| 2017/0255874 A1 * | 9/2017 | Chafle | G06N 20/10 |
| 2019/0325319 A1 * | 10/2019 | Antonio | G06N 20/00 |
| 2020/0314128 A1 * | 10/2020 | Hild | H04L 63/1416 |
| 2020/0326913 A1 * | 10/2020 | Ying | G06F 8/74 |
| 2021/0135925 A1 * | 5/2021 | Mahimkar | G06N 20/00 |
| 2021/0149666 A1 * | 5/2021 | Goern | G06F 8/71 |
| 2021/0342125 A1 * | 11/2021 | Burnett | G06F 16/252 |
| 2021/0409271 A1 * | 12/2021 | Jacob Da Silva | H04L 43/04 |
| 2022/0239562 A1 * | 7/2022 | Raymond | G06F 11/3006 |
| 2022/0242450 A1 * | 8/2022 | Sokolov | B60W 60/0015 |
| 2022/0382615 A1 * | 12/2022 | Turk | H04L 41/16 |
| 2023/0020504 A1 * | 1/2023 | Moon | G06N 20/00 |

* cited by examiner

*Primary Examiner* — Matthew M Kim
*Assistant Examiner* — Matthew N Putaraksa
(74) *Attorney, Agent, or Firm* — Van Pelt, Yi & James LLP

(57) ABSTRACT

A specification of an information technology change is received via an information technology service management system. The specification of the information technology change is analyzed to determine features of the information technology change. Machine-generated data is analyzed to identify a phenomena detected in the machine-generated data. To a machine learning model, the features of the information technology change and features of the detected phenomena in the machine-generated data are provided to determine a correlation between the information technology change and the detected phenomena in the machine-generated data.

20 Claims, 6 Drawing Sheets

AUTOMATICALLY CORRELATING PHENOMENA DETECTED IN MACHINE GENERATED DATA TO A TRACKED INFORMATION TECHNOLOGY CHANGE

BACKGROUND OF THE INVENTION

Often data gathering begins when an end user contacts an information technology (i.e., IT) professional to report an issue. The reported issue is described in the form of symptoms demonstrated from the user's perspective such as, for example, an identifier of an error message, inability to access a service, inability to start a system or program, and the like. For example, the user may call or email an IT professional to say that the workstation takes very long to log in, or may do so via a service portal. The point at which a human operator may start investigating an issue is often far removed from the cause such that determining the cause takes a large amount of effort. User-provided information may include inaccurate, irrelevant, or misleading descriptions of issues provided by users, particularly when the symptoms of those issues are only loosely related to the underlying causes. This leads to misclassification of issues and, therefore, longer time-to-resolve. Additionally, existing solutions often prove inconvenient for end users since they require users to submit information for tickets either personally or via a subordinate. Thus, a user typically needs to call, email, or visit a web portal in order to report an issue. Accordingly, issues often proceed unaddressed until users begin reporting the issues. If the user is not available to report the problem, the reporting may be delayed, thereby resulting in delaying the correction of the problem since the IT department is not aware of the issue. With frequent IT changes, the post-change verification process is often challenging, involving manual steps—which by nature usually end soon after the change has been committed. While many faulty IT changes lead to immediate impact (and thus are simple to detected and link to the change), some will cause slowly-evolving problems or require specific usage-pattern (e.g., browser, locale or geography) to take effect. It would therefore be advantageous to provide a solution that would preemptively detect potential issues that result from an IT change, as soon as possible, before effects of the issue propagate to more and more systems or users.

BRIEF DESCRIPTION OF THE DRAWINGS

Various embodiments of the invention are disclosed in the following detailed description and the accompanying drawings.

DETAILED DESCRIPTION

Figure 1:
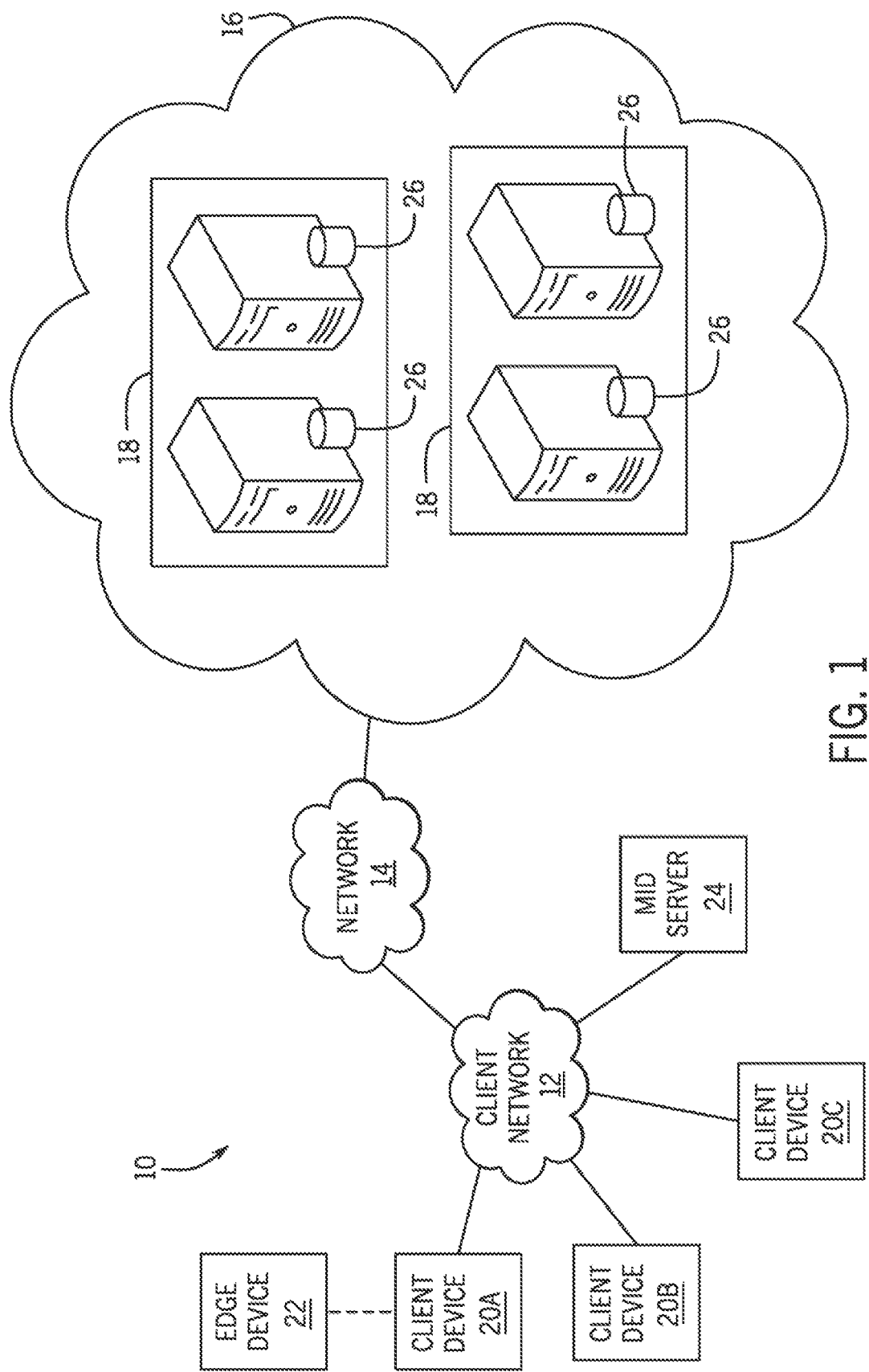
FIG. 1 is a schematic diagram of an embodiment of a computing environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The amount of data logged by various machines (e.g., appliances, servers, software tools, etc.) connected in an organization is enormous. Buried in this data are often the first signs of problems and issues. If these indications can be discovered quickly for resolution, an organization can often prevent effects of these issues from affecting increasing numbers of systems or users, or allow faster solving of the issues. However, the sheer volume of log data makes it impractical for human administrators to monitor and analyze effectively. To ease the burden of analyzing vast amounts of machine-generated data, artificial intelligence (AI) can be utilized to surface the phenomena/anomalies likely of interest to an administrator. However, given the limitations of current AI technology, it often identifies too many indications for an administrator to review and analyze. Because many of these indications turn out to be false alarms or of low or no interest, it would be beneficial to provide the administrator an ability to triage these indications based on automatically determined impact and severity. In some embodiments, a phenomena detected in machine-generated data (e.g., log data) is automatically correlated to an information technology change that likely caused the phenomena. By identifying the underlying information technology change, its impact, severity, and/or resolution can be better determined.

In some embodiments, a machine learning model is used in the correlation between a phenomena detected in machine-generated data and an information technology change. For example, a specification of an information technology change is received from an information technology service management system. The specification of the information technology change is analyzed to determine identifying properties of the information technology change. Machine-generated data is analyzed to identify a phenomena detected in the machine-generated data. The identifying properties of the information technology change and properties of the detected phenomena in the machine-generated data are provided to the machine learning model to determine a correlation between the information technology change and the detected phenomena in the machine-generated data.

With the preceding in mind, the following figures relate to various types of generalized system architectures or configurations that may be employed to provide services to an organization on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, in which embodiments of the present disclosure may operate, is illustrated. The computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as a local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20A-C may be computing systems and/or other types of computing devices generally referred to as Internet of Things (IoT) devices that access cloud computing services, for example, via a web browser application or via an edge device 22 that may act as a gateway between the client devices 20A-C and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20A-C and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WIFI networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20A-C via the client network 12 and network 14. The network hosting the platform 16 provides additional computing resources to the client devices 20A-C and/or the client network 12. For example, by utilizing the network hosting the platform 16, users of the client devices 20A-C are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of servers 26 (also referred to herein as application nodes, virtual servers, application servers, virtual server instances, application instances, or application server instances), where each server 26 can be implemented on a physical computing system, such as a single electronic computing device (e.g., a single physical hardware server) or across multiple-computing devices (e.g., multiple physical hardware servers). Examples of servers 26 include, but are not limited to, a virtual server, a web server (e.g., a unitary Apache installation), an application server (e.g., a unitary Java Virtual Computer), and/or a database server.

To utilize computing resources within the platform 16, network operators may choose to configure the data centers 18 using a variety of computing infrastructures. In one embodiment, one or more of the data centers 18 are configured using a multi-instance cloud architecture to provide every customer with its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

In some embodiments, the cloud-based platform 16 includes a computer-generated data management server that receives via network 14 and/or an internal network within or across different data centers, computer-generated data for storage and analysis. For example, log entries are sent from client devices/servers 20, MID server 24 (e.g., agent server acting as the intermediary in client network 12 to facilitate access to client network 12 by the network hosting the platform 16), and/or servers in data centers 18 to a log management server in data centers 18. In some embodiments, the computer-generated data management server is utilized to perform analysis of the received computer-generated data. Performing the analysis may include automatically detecting phenomena in computer-generated data (e.g., log lines/entries) and matching the phenomena to a tracked IT change. Examples of the phenomena include an anomaly, an error, a new, cessation, or change in trend/behavior, etc. The IT change may be identified using data from a server of data centers 18 providing information technology service management (ITSM) and/or data from a server of data centers 18 providing a configuration management database (CMDB). For example, a specification of an information technology change received from ITSM is utilized to identify associated hardware, software, and/or network identifiers from CMDB. It may also include description of the change, the risks, mitigation plan etc.—any of which might include further relevant information (e.g., the change description might be "decrease size of database connection pool", and the detected anomaly will be of a log saying "connection pool is full"). The detected phenomena can be correlated (e.g., using machine learning) with these identifiers to match the phenomena to a tracked IT change. Based on the analysis, automatic action may be taken. For example, a service request ticket, an alert, or a message identifying a detected anomaly is provided. In another example, an IT change is at least in part stopped or reversed. In another example, access to a certain data, system, service, account, and/or network may be suspended based on the analysis.

Although FIG. 1 illustrates specific embodiments of a cloud computing system 10, the disclosure is not limited to the specific embodiments illustrated in FIG. 1. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. The use and discussion of FIG. 1 are only examples to facilitate ease of description and explanation and are not intended to limit the disclosure to the specific examples illustrated therein. As may be appreciated, the respective architectures and frameworks discussed with respect to FIG. 1 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 2:
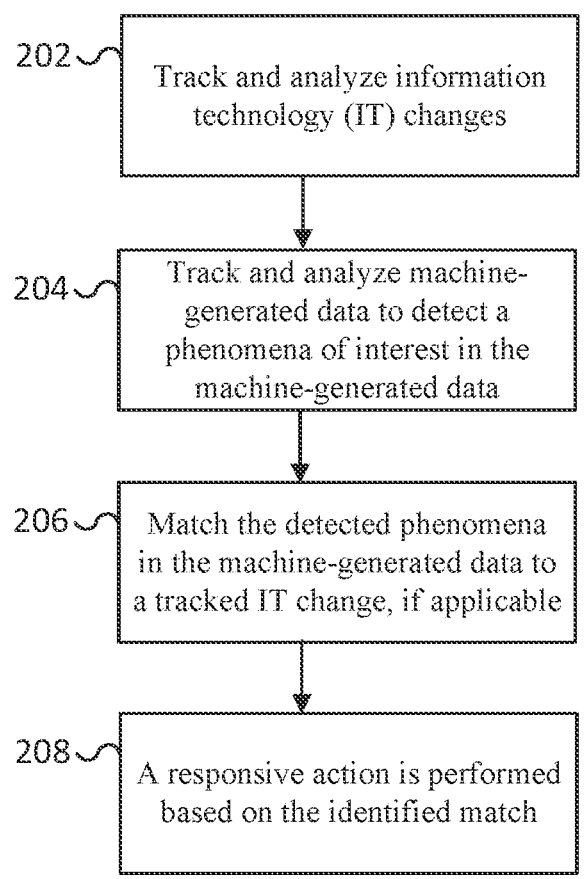
FIG. 2 is a flowchart illustrating an embodiment of a process for matching a detected phenomena in machine-generated data to an information technology change.

FIG. 2 is a flowchart illustrating an embodiment of a process for matching a detected phenomena in machine-generated data to an information technology change. The process of FIG. 2 may be implemented on a server included in data center 18 of FIG. 1.

At 202, information technology (IT) changes are tracked and analyzed. In some embodiments, specifications of IT changes are received from an IT Service Management (ITSM) system. For example, when a user submits a change request to the ITSM and/or the change request becomes approved and implemented, the specification of the change request or implemented change is received for tracking and analysis. The IT Service Management (ITSM) enables management and delivery of services to users through a single cloud-based platform, including users to build and deploy IT services via a lifecycle stage that ensures the changes to services and service management processes are carried out in a coordinated way. Thus, ITSM provides change management that enables a systematic approach to control the life cycle of all changes, facilitating beneficial changes to be made with minimum disruption to IT services. In order to initiate a change to add, modify, or remove of any IT hardware or software that could have a direct or indirect effect on IT services, a user submits a change request to ITSM. This would typically include changes to IT infrastructure, applications, documentation, processes, supplier relationships, and any other critical components of the service. For example, a change request allows a user to implement a controlled process for the addition, modification, or removal of approved and supported configuration items (CIs) tracked in a CMDB. The change request records the detailed information about the change, such as a link to a change made to software (e.g., in a Version Control System) which detail a new log entry, a reference to defect/feature, a human-language description of a change (e.g., written by a developer), a reason of the change, a priority, a risk, a type of change, an identifier IT item to be changed, an identifier of the requestor, identifier(s) of the end user(s) affected, identifying information about the target hardware/software/network, a time of the change, and/or a change category.

Performing the analysis of an IT change may include analyzing the specification of the IT change to identify one or more properties that can be directly used as identifying properties or used to obtain other/additional identifying properties (e.g., via a CMDB) of the IT change. These identifying properties may serve as input features of machine learning used to correlate/match a detected phenomena to the IT change. The corresponding identifying properties of IT changes may be stored in a data structure for use during the correlations/matching.

At 204, machine-generated data is tracked and analyzed to detect a phenomena of interest in the machine-generated data. For example, machine-generated log entries of data collected during operation of IT components are received, and the log entries are analyzed using machine learning to identify any phenomena of interest. Examples of the phenomena include anomalies, warnings, errors, new or changes in trends/behaviors, or any other indication of abnormities, changes, or problems. Various examples of tracking or analyzing machine-generated data can be found in application Ser. No. 15/785,863 (now U.S. Pat. No. 10,600,002) entitled MACHINE LEARNING TECHNIQUES FOR PROVIDING ENRICHED ROOT CAUSES BASED ON MACHINE-GENERATED DATA filed Oct. 17, 2017, and application Ser. No. 15/228,272 entitled CROSS-PLATFORM CLASSIFICATION OF MACHINE-GENERATED TEXTUAL DATA filed October Aug. 11, 2016, and application Ser. No. 15/499,060 entitled DETERMINING ROOT-CAUSE OF FAILURES BASED ON MACHINE-GENERATED TEXTUAL DATA filed October Apr. 27, 2017, all of which are incorporated herein by reference for all purposes.

At 206, the detected phenomena in the machine-generated data is matched to a tracked IT change, if applicable. Often an IT system administrator relies on customers to report an issue or alerts tied to fixed thresholds and triggers that often generate too many noisy alerts. This is problematic because a change by nature often involves introducing a new baseline, or even new behavior—which is unsuitable for fixed thresholds and triggers. Additionally a triggered alert or customer report will arise from impacts of the root-cause of the problem—making it more difficult in identifying the root-cause of the problem. For example, when a root-cause problem is a disk malfunction of a database, the reported symptoms may be users being unable to load a website due to an impacted webserver being impacted. Additionally, due to short correlation windows of prior post IT change manual verification processes, slowly-evolving problems caused by IT changes may be missed during the initial verification processes. For example, a change on Friday night might only cause issues on Monday morning (e.g., when people are back to work)—and in that point in time it's difficult for the IT operators to link the problem back to a change from before the weekend. These problems get compounded in modern mid-size IT environments with frequently dozens if not much more daily changes.

By using automated analysis to match the phenomena in detected logs (e.g., often the most helpful data source in problem resolution) and other machine-data to an IT change, correlations between an IT change and its consequences can be automatically determined over longer correlation windows quickly and more efficiently and more helpful additional information (e.g., IT change information) in solving or triaging the problem can be provided—thus improving mean time to repair (MTTR). In some embodiments, the matching the detected phenomena to a tracked IT change includes determining correlations between properties of the detected phenomena to identifying properties of candidate IT changes. A trained machine learning model may be used to determine the correlations. The IT change associated with best correlation above a threshold may be selected as the matched IT change to the detected phenomena.

At 208, a responsive action is performed based on the identified match. In some embodiments, a service request ticket, an alert, or a message identifying a detected anomaly is automatically provided. For example, based on information about the detected phenomena and the matched IT change, a service request ticket to fix the issue is automatically populated to relevant information and entered into a ticketing system of an ITSM for resolution (e.g., administrator(s)/employee(s) accountable for the matched IT change are identified and/or assigned the service request ticket). In some embodiments, if a resolution (e.g., IT change to be at least in part stopped or reversed) can be automatically identified with sufficiently high confidence based on information about the detected phenomena and the matched IT change, the resolution is automatically performed (e.g., if the change request included a rollback procedure that can be triggered automatically). In another example, performing the responsive action includes suspending access to certain data, systems, services, accounts, and/or networks.

In some embodiments, predictive ticketing utilizing machine learning techniques is used to generate predicted tickets based at least in part on an identified match. For example, a machine learning algorithm is configured to perform its learning based on historical match of detected phenomena and root cause IT change and historical tickets in order to learn a description that describes the phenomena and root cause IT change most accurately, most precisely, or both. Features extracted from, for example, the textual descriptions of issues, environmental context data (e.g., time of creation of a ticket), and phenomena/IT change data (e.g., identification of root cause, end user issues, etc.) may be utilized for the machine learning. In an embodiment, a suitability model is created using machine learning based on features including historical insight parameters, historical incident parameters, and historical matches between insights and corresponding incidents. To this end, the features are extracted from a historical data set including at least historical tickets associated with IT changes. The historical tickets include textual descriptions of symptoms of historical incidents and historical insights. The historical insights indicate identifiers of respective historic incidents/phenomena, associated IT change, recommendations of actions used for resolution of the respective historical incidents (e.g., for mitigating or fixing incidents), or a combination. The suitability model may be continuously refined as new data is received. During an operational phase, when the phenomena and matching IT change is detected, the suitability model outputs a suitable insight for the incident. A predictive ticket may be created based on the suitable insight. The predictive ticket includes at least a textual description of a phenomena and corresponding IT change that caused it and may further include one or more recommendations for resolution. As a result, the disclosed embodiments allow for providing IT tickets more quickly, processing IT tickets more efficiently, and avoiding human error in ticket data. Further, tickets may be provided preemptively prior to the appearance of symptoms from an end user's perspective. Accordingly, responses to these IT tickets may be more efficient and involve less trial and error than existing manual ticketing processes that rely on user-provided reporting of symptoms for ticket creation and processing.

Figure 3:
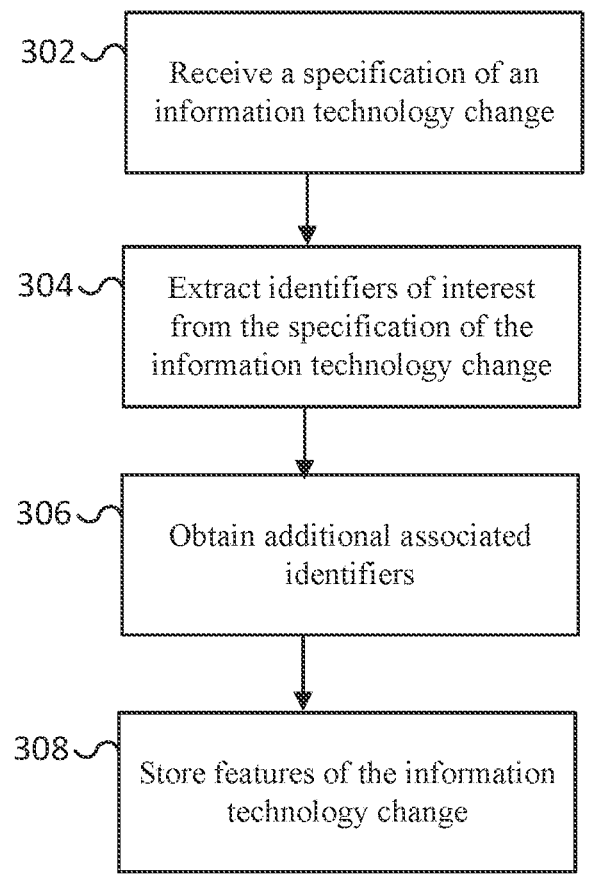
FIG. 3 is a flowchart illustrating an embodiment of a process for obtaining identifying properties of an IT change.

FIG. 3 is a flowchart illustrating an embodiment of a process for obtaining identifying properties of an IT change. The process of FIG. 3 may be implemented on a server included in data center 18 of FIG. 1. In some embodiments, at least a portion of the process of FIG. 3 is performed in 202 of FIG. 2. In some embodiments, the process of FIG. 3 is repeated for each new implemented information technology change.

At 302, a specification of an information technology (IT) change is received from an information technology service management system. For example, when a user submits a change request to the ITSM and/or the change request becomes approved and implemented, the specification of the change request or implemented change is received at an analysis server from the ITSM for tracking and analysis. The specification may specify changes to IT infrastructure, applications, documentation, processes, supplier relationships, and any other critical components of the IT service. For example, the specification includes information about the change, such as the reason of the change, the priority, the risk, the type of change, the identifier IT item to be changed, the identifier of the requestor, the identifier(s) of the end user(s) affected, the identifying information about the target hardware/software/network, the time of the change, and/or the change category.

At 304, identifiers of interest are extracted from the specification of the information technology change. An example is identifiers of one or more properties that can be directly used as features or used to obtain other/additional features of the IT change. These features are to be correlated with properties of detected phenomena in logs to identify matches. Examples of the identifiers include identifiers associated with one or more of the following: a reason for the IT change, a priority, a risk level/type, a type of change, an IT item to be changed, a requestor of the IT change, end user(s) affected, a target hardware/software/network, a time of the IT change, and/or a change category.

At 306, additional associated identifiers are obtained. In some embodiments, based on identifiers identified in 304, additional associated identifiers are obtained. For example, a configuration item (CI) associated with one or more identifiers extracted in 304 is identified in a CMDB and additional identifiers in the configuration item (CI) are obtained as the associated identifiers. In one example, a search is performed in a CMDB using one or more identifiers extracted in 304 and a matching CI is obtained. The additional associated identifiers obtained from the matching CI include one or more identifiers associated with one or more of the following: a hardware device, a software, configurations, parameters, components, settings, a physical entity, a logical entity, a conceptual entity, etc.

The CMDB stores and tracks the discovered configuration items (CIs) of an IT environment. Such information stored on the CMDB may then be used by other applications and/or by IT personnel in managing or using the resources on the network. On computer systems, the discovery process may identify CIs such as software applications running on discovered devices, and any connections, such as Transmission Control Protocol (TCP) connections between discovered devices. Discovery may also be used to track the relationships between computer systems, such as an application program running on one server that utilizes a database stored on another server. CI discovery may be performed at initial installation or at instantiation of connections or new devices, and/or CI discovery may be scheduled to occur periodically to track additions, removals, or changes to the IT devices being managed, thereby keeping data stored on the CMDB. Thus, using an ongoing discovery process, an up-to-date map of devices and their infrastructural relationships may be maintained.

In such an interconnected but distributed context, the configuration of each of these devices may be represented by configuration items (CIs) that detail certain configurations, parameters, components, software, or settings associated with a respective device. As will be discussed in greater detail below, CIs may include information related to a physical entity (e.g., hardware), a logical entity (e.g., version, instance of a database), a conceptual entity (e.g., service), and the like associated with a respective device. Given the wide variety of CIs associated with various devices within this type of complex IT environment, configuration item (CI) discovery executed on a given infrastructure is used to track the CIs of the devices that are present on the connected IT environment. That is, CI discovery is the process of finding configuration items, such as hardware, software, documentation, location, and other information related to the devices, connected to a given network, such as an enterprise's network. This discovery process may be performed at least partially using automated routines, e.g., an application program, running on the network in question. When a CI is found by such routines, discovery includes exploring some or all of the CI's configuration, provisioning, and current status. This explored information is used to update one or more databases, such as the CMDB, accordingly.

At 308, features of the IT change are stored. For example, at least a selected portion of the extracted and obtained identifiers is stored in an entry in a data structure associated with the IT change. The data structure is able to include different entries for different tracked IT changes. This data structure can be later used when searching through, correlating, and matching any detected phenomena to a specific IT change, if applicable. For example, the features can be obtained from the data structure and provided to a machine learning model as machine learning features of the IT changes to determine a measure of correlation between the detected phenomena and the specific IT change.

Figure 4:
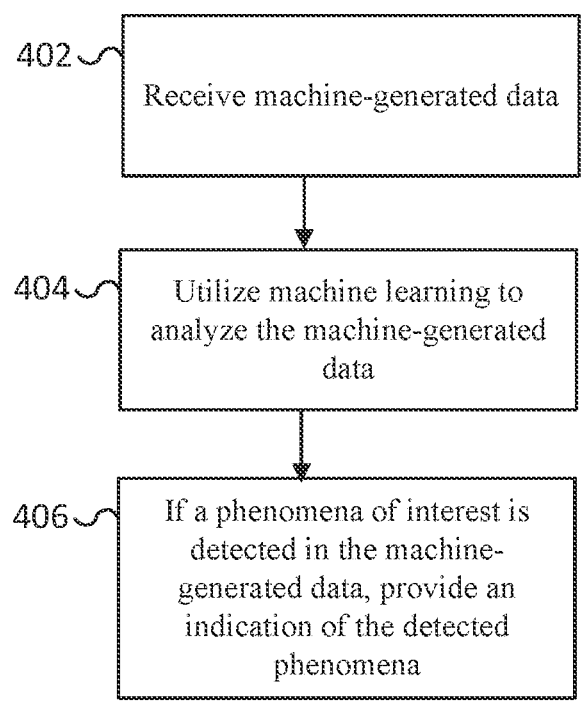
FIG. 4 is a flowchart illustrating an embodiment of a process for detecting a phenomena in machine-generated data.

FIG. 4 is a flowchart illustrating an embodiment of a process for detecting a phenomena in machine-generated data. The process of FIG. 4 may be implemented on a server included in data center 18 of FIG. 1. In some embodiments, at least a portion of the process of FIG. 4 is performed in 204 of FIG. 2.

At 402, machine-generated data is received. An example of the computer-generated data includes log entries/lines including recording of computer events. For example, alerts, status, outputs, transactions, messages, or other events of an application or other computer software or hardware component are outputted (e.g., continual stream) to a log as entries/lines in the log (e.g., file, database, memory, etc.). The computer-generated data may be generated by a customer device and sent for storage and/or analysis by a third-party service provider device (i.e., third-party different from sending party) and/or generated by a local device and sent to another networked device for storage and/or analysis. Examples for the computer-generated data sources include any IT-based device, such as routers, network appliances, application servers, database servers, sensors, and the like. The computer-generated data may be encapsulated in CSV files, JSON files, XML files, plain text files, and so on. Such files can be pulled by the server, pushed to the server, uploaded to the server, received through other methods or channels, or a combination thereof. Typically, JSON and XML, files are streamed in real-time while CVS files are uploaded in batches. Log entries may be periodically and/or dynamically generated and locally cached (e.g., in a local file and/or database) for a period of time. New log entries that have not been sent can then be transferred to a destination in batches (e.g., each may contain new log entries not included in previously sent batches and/or may be capped in size up to a size limit). Each batch can be sent periodically (e.g., a new batch sent at periodic intervals) and/or dynamically (e.g., when the size of log entries not yet sent reaches a threshold size). In some embodiments, the destination receives the computer-generated data and stores/archives the computer-generated data and/or performs processing and/or analysis. For example, the destination serves as a log repository and/or a log analysis service provider.

Examples of logged data includes application logs (e.g., webserver access logs, database slow-query logs, or other proprietary application logs written by the developers of the software and describing the state of the application) or time-series data. IT networks may include server systems that acquire and store data related to a number of measurable properties. For example, for a given computer system, data regarding states/events of applications or performance of computer resources (e.g., central processing unit, disk, memory transaction count), instance cache size, code performance data (e.g., business rules count, cache size), large record counts (e.g., open incidents, tests), and the like may be stored at various times in a log/database (e.g., time-series database) accessible to a server system. As the amount of stored data increases, along with date/time stamps regarding when the data was acquired, it becomes increasingly difficult to analyze the stored data to identify subsets of the data that may be relevant to a particular issue or problem.

Generally, time-series data may include data acquired at various times and stored in a database (e.g., a time-series database). Time-series data can provide valuable insight with regard to trends and/or correlations related to certain events. For instance, performance properties (e.g., CPU usage, memory usage) of a computer system may be tracked and stored as time-series data, allowing such performance properties to be analyzed over time, over a limited window of time, or in view of various periodic or time-based conditions (e.g., CPU usage every third Friday or on the 15th of each month) that may be otherwise difficult to perceive.

Anomalies within the logged data may indicate a problem within the system. Accordingly, it may be desirable to monitor anomalies in logged data to detect an existing issue or to diagnose issues at an early stage, such that remedial measures, such as anomaly reporting, hardware replacement, etc. may be performed. However, given the vast amount of logged data representing multitudes of measurable states, events, and properties, anomaly detection may be difficult, especially considering other data changing patterns that may arise in certain types of data. False anomaly detection may lead to false reporting, which may desensitize users to anomaly reports and/or lead to unnecessary maintenance or remedial operations being performed.

Accumulated machine-generated data may be analyzed to classify the logged data by one or more qualitative classifications. The classifications may be used to generate a model of the logged data, which may help to identify anomalies (e.g., outlier data that falls outside of upper and/or lower bounds of the model). Anomalous scores for the logged data may be generated based at least in part upon an accumulation of anomalies over a certain dynamically-adjustable window of time.

By leveraging these anomalous scores, a simple, yet easily understandable indication of anomalies within the IT system may be provided. Further, by using an accumulation of anomalies over an adjustable time window as the basis for the anomalous score, increased accuracy may be obtained. That is, instead of relying on a static window of time, the time window may be adjusted based upon a variety of factors. For example, in one embodiment, the time window may be adjusted to be relatively longer when a probability of the time-series data falling in a normal range is low. This may extend the monitoring window, such that even slight anomalies are monitored, when there is a low probability that the time-series data falls into a normal range. In such embodiments, the time window may also be adjusted to be relatively shorter when the probability of the time-series data falling in a normal range is high.

At 404, machine learning is utilized to analyze the machine-generated data. For example, a machine learning model (e.g., a decision tree, a naive Bayes classifier, a neural network, a support-vector machine, etc.) is utilized to analyze the machine-generated data.

The machine learning model may be a supervised machine learning classifier. For example, given an input machine-generated data, the classifier classifies at least a portion of the machine-generated data into one or more classifications as to whether it is a part of one or more phenomena classifications of interest. For example, certain log entries may be classified as not a part of a phenomena of interest while another log entry may be classified as a part of a specific class of phenomena among many classes/types of phenomena able to be classified. The machine learning classifier has been trained to identify each of these different classes/types of phenomena. Examples of the different classes/types of phenomena include an anomaly, an error, a new trend, a change (e.g., modification or cessation) in a previously identified trend/behavior, etc.

A supervised machine-learning classifier operates as a (generally nonlinear) function of the feature set. The training process produces a trained classifier that operates as a function from the feature set to the classification set. For example, if the feature set is represented as an array of values, X, the supervised learning may result in some function $f(X)$ from the training data, with the goal of reproducing the hand-classification of the training data, while also generalizing to data outside of the training data set. Accordingly, during training, function $f(X)$ is fit, such that it does not over-fit the training data. In other words, some elements of the training set may be classified incorrectly in order to generalize to data outside of the training set. Overfitting may be avoided using various strategies, such as cross-validation, where training only occurs with respect to a part of the labeled training set, holding out some of the labeled samples for testing, and testing the trained classifier using the held back samples of the data-set that were not used in the training.

The machine model may have been trained using a labeled training set. For example, once the training set is labelled, features of the training set may be computed and a classifier logic may be trained using the labelled training set and associated features. These features may include: basic statistics (minimum, maximum, range, mean, median, standard deviation, various robust statistics that ignore outliers, such as the inter-quartile range, etc.), various ratios and other functions of these statistics, the number of data points, the number of distinct values, several measures of the frequency spectrum (fraction of power in low, medium, and high frequency ranges, the location of the frequency peak, etc.), other statistics (e.g. the median of the exponentially-weighted moving variability, measures of whether the time series has a statistically significant seasonality and/or trend, etc.), etc.

In some embodiments, features sets ($X^*$) for machine-generated data are computed. The machine learning model may classify the machine-generated data based upon the feature set ($X^*$) of the machine-generated data. For example, as mentioned above, during training, a choice of function $f(X)$ is determined. To classify the machine-generated data, the computed feature sets ($X^*$) for the incoming data may be passed to the function, as the function has been generalized for data outside of the training set. Accordingly, the classification of the machine-generated data may be represented as $f(X^*)$.

In some embodiments, feedback regarding the classification by the machine learning classifier may be received. For example, a user interface may be provided for customer feedback regarding whether the machine learning model accurately classified the machine-generated data. Further, in some embodiments, the customer feedback may include a correct classification for a misclassified data. When feedback is received, the feedback may be used to refine the training of the machine learning classifier. The machine learning classifier may also be periodically re-trained using additional labelled training sets.

At 406, if a phenomena of interest is detected in the machine-generated data, an indication of the detected phenomena is provided. For example, if the machine learning provides a result that classifies at least a portion of the machine-generated data as indicating a phenomena, the indication of the phenomena is provided to trigger further analysis and/or resolution. The results of the machine learning may provide a measure of confidence in its phenomena classification determination, and if the measure of confidence is above a threshold value, it is determined that the phenomena of the classification has been detected. The provided indication of the phenomena may include an identifier of the type/classification of the phenomena, identification/content of one or more log entries/lines classified/associated with the detected phenomena, and/or other metadata information (e.g., identifying information of network, hardware, and/or software that generated the associated log entries/lines, etc.).

Figure 5:
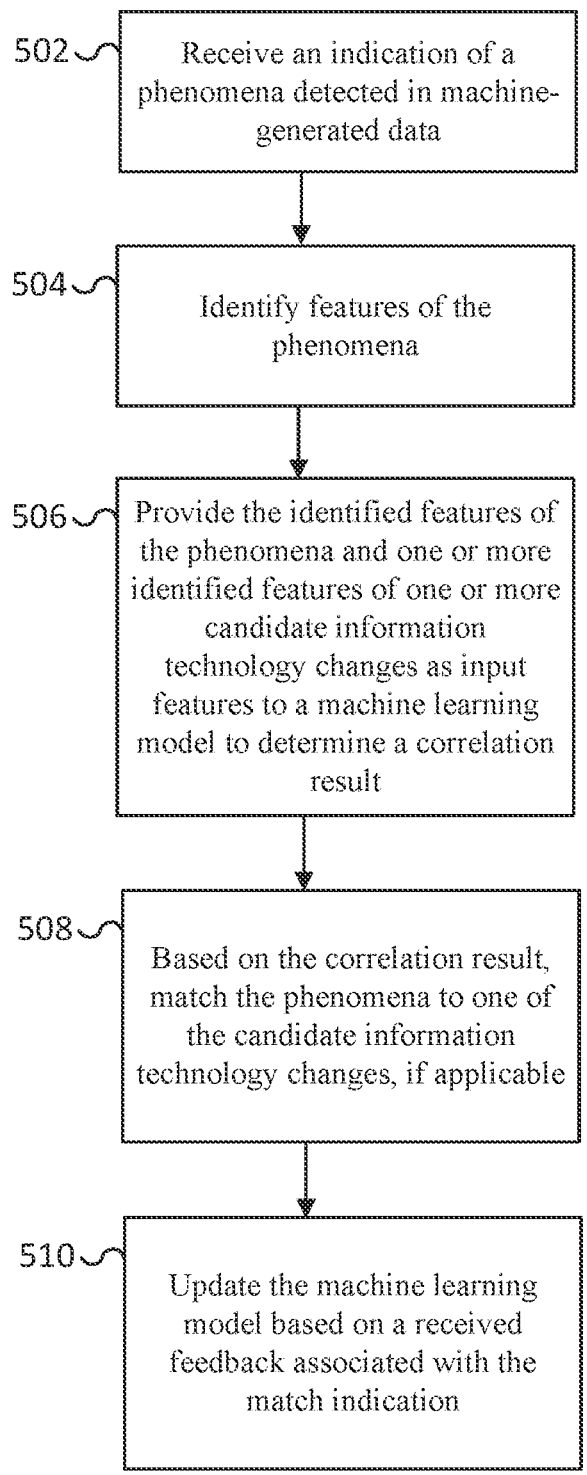
FIG. 5 is a flowchart illustrating an embodiment of a process for correlating a detected phenomena in machine-generated data to a previous IT change.

FIG. 5 is a flowchart illustrating an embodiment of a process for correlating a detected phenomena in machine-generated data to a previous IT change. The process of FIG. 5 may be implemented on a server included in data center 18 of FIG. 1. In some embodiments, at least a portion of the process of FIG. 5 is performed in 206 of FIG. 2.

At 502, an indication of a phenomena detected in machine-generated data is received. For example, the indication provided in 406 of FIG. 4 is received.

At 504, features of the phenomena are identified. For example, machine learning features in the indication of the phenomena to be provided as inputs to a machine learning model are obtained. Examples of the features in the received indication of the phenomena include one or more identifiers associated with one or more of the following: a type/classification of the phenomena, an identification/content of one or more log entries/lines classified/associated with the detected phenomena, metadata information, or identifying information of network, hardware and/or software that generated the associated log entries/lines of the phenomena. In some embodiments, the features of the phenomena are obtained from another source using one or more identifiers included in the phenomena. For example, based on identifiers in the received indication, additional associated identifiers are obtained from an associated configuration item (CI) in a CMDB. In one example, a search is performed in a CMDB using one or more identifiers in the received indication and a matching CI is obtained. The additional associated identifiers obtained from the matching CI include one or more identifiers associated with one or more of the following: a hardware device, a software, configurations, parameters, components, settings, a physical entity, a logical entity, a conceptual entity, etc.

At 506, the identified features of the phenomena and one or more identified features of one or more candidate information technology changes are provided as input features to a machine learning model to determine a correlation result. The machine learning model takes the provided inputs and determines a correlation and/or a match between the phenomena and an information technology change, if possible.

The machine learning model may be a supervised machine learning model, an unsupervised machine learning model, or an active machine learning model. For example, the machine learning model has been trained based on previously identified valid matches between different phenomena (and its features) and one corresponding tracked information technology change (and its features). The one or more identified features of the one or more candidate information technology changes may be obtained from a data structure tracking information technology changes. For example, the data structure entries stored in 308 of FIG. 3 are utilized. In some embodiments, the one or more candidate information technology changes are selected based on a time associated with the phenomena. For example, an earliest creation/entry time of a log entry associated with the phenomena is utilized as a start time of the phenomena, and only information technology changes implemented within a specified window of time before the start time of the phenomena are its candidate information technology changes. The one or more identified features of these identified candidate information technology changes then can be obtained from corresponding entries of the data structure stored in 308 of FIG. 3.

In some embodiments, the correlation result includes a different correlation score value for different ones of the candidate information technology changes. In some embodiments, the correlation result includes an identifier of an identified match among the candidate information technology changes along with a measure of confidence. In some embodiments, one possible correlation result is an indication that there does not exist a matching information technology change.

At 508, based on the correlation result, the phenomena is matched to one of the candidate information technology changes, if applicable. For example, the matching information technology change is identified and indicated as a cause of the phenomena. The matched information technology change is indicated and may be utilized in 208 of FIG. 2 to perform a responsive action. In some embodiments, the correlation result includes a different correlation score value for different ones of the candidate information technology changes (e.g., a measure of likelihood the corresponding candidate information technology change is a cause of the detected phenomena), and the candidate information technology change with the best correlation score value that meets a threshold is selected as the matching information technology change to the phenomena. If no correlation score value meets the threshold, no matching information technology change is indicated. In some embodiments, the correlation result includes an identifier of the identified match among the candidate information technology changes along with a measure of confidence, and if the measure of confidence is above a confidence threshold, this identified match is selected as the matching information technology change to the phenomena. If no candidate information technology change has been selected or if the measure of confidence does not meet the confidence threshold, no matching information technology change is indicated.

At 510, the machine learning model is updated based on a received feedback associated with the match indication. For example, when a direct or indirect indication of the match between the phenomena and the matched information technology change is provided or utilized, a direct or indirect feedback is received on the correctness of the match. For example, a system administrator provides a feedback on the correctness of the match. Using this feedback information, the machine learning model is further trained to improve its correlation/matching predictions. Step 510 is optional in various embodiments.

Figure 6:
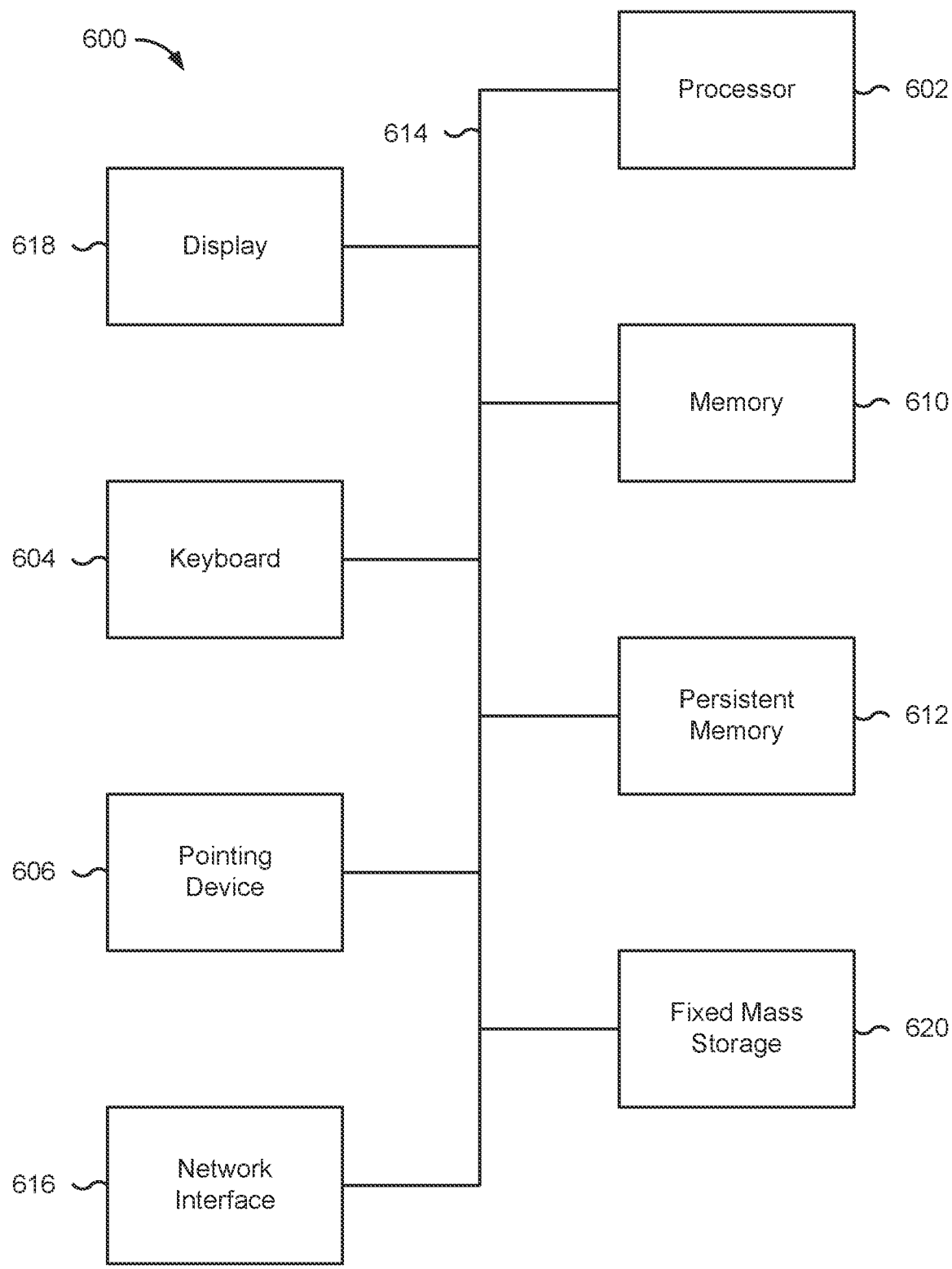
FIG. 6 is a functional diagram illustrating a programmed computer system.

FIG. 6 is a functional diagram illustrating a programmed computer system. In some embodiments, the programmed computer system is any device or server shown in FIG. 1.

In the example shown, computer system 600 includes various subsystems as described below. Computer system 600 includes at least one microprocessor subsystem (also referred to as a processor or a central processing unit (CPU)) 602. For example, processor 602 can be implemented by a single-chip processor or by multiple processors. In some embodiments, processor 602 is a general-purpose digital processor that controls the operation of computer system 600. Using instructions retrieved from memory 610, processor 602 controls the reception and manipulation of input data, and the output and display of data on output devices (e.g., display 618).

Processor 602 is coupled bi-directionally with memory 610, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also, as is well known in the art, primary storage typically includes basic operating instructions, program code, data, and objects used by processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

Persistent memory 612 (e.g., a removable mass storage device) provides additional data storage capacity for computer system 600, and is coupled either bi-directionally (read/write) or uni-directionally (read only) to processor 602. For example, persistent memory 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Persistent memory 612 and fixed mass storage 620 generally store additional programming instructions, data, and the like that typically are not in active use by processor 602. It will be appreciated that the information retained within persistent memory 612 and fixed mass storages 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, pointing device 606 can be a mouse, stylus, track ball, or tablet, and is useful for interacting with a graphical user interface.

Network interface 616 allows processor 602 to be coupled to another computer, computer network, or telecommunications network using a network connection as shown. For example, through network interface 616, processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect computer system 600 to an external network and transfer data according to standard protocols. Processes can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   training a machine learning model based on previously identified valid matches between different phenomena detected in different machine-generated data and corresponding different root cause information technology changes;
   receiving via an information technology service management system, a specification of an information technology change detected in the information technology service management system;
   analyzing the specification of the information technology change to determine features of the information technology change;
   tracking the information technology change in a data structure of tracked information technology changes and their features;
   analyzing machine-generated computer log data to identify a change detected in the machine-generated computer log data;
   providing to the trained machine learning model the features of the information technology change and features of the identified change in the machine-generated computer log data; and
   identifying a match between the information technology change tracked in the data structure among other information technology changes tracked in the data structure and the identified change in the machine-generated computer log data based on a result of the trained machine learning model.

2. The method of claim 1, further comprising performing a responsive action in response to the match.

3. The method of claim 2, wherein performing the responsive action includes automatically generating a service request ticket to resolve an anomaly associated with the identified change in the machine-generated computer log data.

4. The method of claim 1, wherein the result of the machine learning model includes a correlation score value identifying a likelihood the information technology change is a cause of the identified change in the machine-generated computer log data.

5. The method of claim 1, wherein the information technology change is determined as a causation of the identified change in the machine-generated computer log data.

6. The method of claim 1, wherein the identified match includes a measure of confidence, and it is determined that the information technology change matches the identified change in the machine-generated computer log data based at least in part on a determination that the measure of confidence meets a threshold.

7. The method of claim 1, wherein the machine learning model is retrained based on a received feedback associated with the match.

8. The method of claim 1, wherein the specification of the information technology change is associated with a change request submitted to the information technology service management system.

9. The method of claim 1, wherein the specification of the information technology change identifies a change to a software component or a hardware component of an information technology infrastructure.

10. The method of claim 1, wherein analyzing the specification of the information technology change includes extracting one or more identifiers from the specification of the information technology change.

11. The method of claim 1, wherein the features include identifiers associated with one or more of the following: a reason for the information technology change, a priority of the information technology change, a risk level or risk type of the information technology change, a change type of the information technology change, an information technology item to be changed, a requestor of the information technology change, end user(s) affected, a target hardware of the information technology change, a target software of the information technology change, a target network of the information technology change, a category of the information technology change, or a time of the information technology change.

12. The method of claim 1, wherein analyzing the specification of the information technology change includes identifying a configuration item of a configuration management database (CMDB) associated with the information technology change and obtaining one or more identifiers from the configuration item of the CMDB.

13. The method of claim 1, wherein analyzing the machine-generated computer log data to identify the identified change in the machine-generated computer log data includes using a supervised machine learning classifier to classify at least a portion of the machine-generated computer log data as a specific type of the identified change.

14. The method of claim 1, wherein the identified change in the machine-generated computer log data is associated with one or more of the following: an error, a new trend, a cessation of an identified behavior, or a change in a previously identified trend.

15. The method of claim 1, wherein the features of the identified change in the machine-generated computer log data include one or more identifiers associated with one or more of the following: a type or classification of the identified change an identification or content of one or more log entries associated with the identified change metadata information of the identified change, identifying information of a network, or a hardware or a software that generated the log entries associated with the identified change.

16. The method of claim 1, wherein the features of the identified change in the machine-generated computer log data include one or more identifiers obtained using a configuration management database.

17. A system, comprising:
one or more processors configured to:
train a machine learning model based on previously identified valid matches between different phenomena detected in different machine-generated data and corresponding different root cause information technology changes;
receive via an information technology service management system, a specification of an information technology change detected in the information technology service management system;
analyze the specification of the information technology change to determine features of the information technology change;
track the information technology change in a data structure of tracked information technology changes and their features;
analyze machine-generated computer log data to identify an identified change in the machine-generated computer log data;
provide to the trained machine learning model the features of the information technology change and features of the identified change in the machine-generated computer log data; and
identify a match between the information technology change tracked in the data structure among other information technology changes tracked in the data structure and the identified change in the machine-generated computer log data based on a result of the trained machine learning model; and
a memory coupled to at least one of the one or more processors and configured to provide the at least one of the one or more processors with instructions.

18. The system of claim 17, wherein the one or more processors are further configured to automatically generate a service request ticket in response to the match to resolve an anomaly associated with the identified change in the machine-generated computer log data.

19. The system of claim 17, wherein the result of the machine learning model includes a correlation score value identifying a likelihood the information technology change is a cause of the identified change in the machine-generated computer log data.

20. A computer program product, the computer program product being embodied in a non-transitory computer readable storage medium and comprising computer instructions for:
training a machine learning model based on previously identified valid matches between different phenomena detected in different machine-generated data and corresponding different root cause information technology changes;
receiving via an information technology service management system, a specification of an information technology change detected in the information technology service management system;
analyzing the specification of the information technology change to determine features of the information technology change;
tracking the information technology change in a data structure of tracked information technology changes and their features;
analyzing machine-generated computer log data to identify a change detected in the machine-generated computer log data;

providing to the trained machine learning model the features of the information technology change and features of the identified change in the machine-generated computer log data; and identifying a match between the information technology change tracked in the data structure among other information technology changes tracked in the data structure and the identified change in the machine-generated computer log data based on a result of the trained machine learning model.

* * * * *